P. E. YOUNG.
FOCUSING DEVICE.
APPLICATION FILED JULY 23, 1915.
1,252,762.
Patented Jan. 8, 1918.
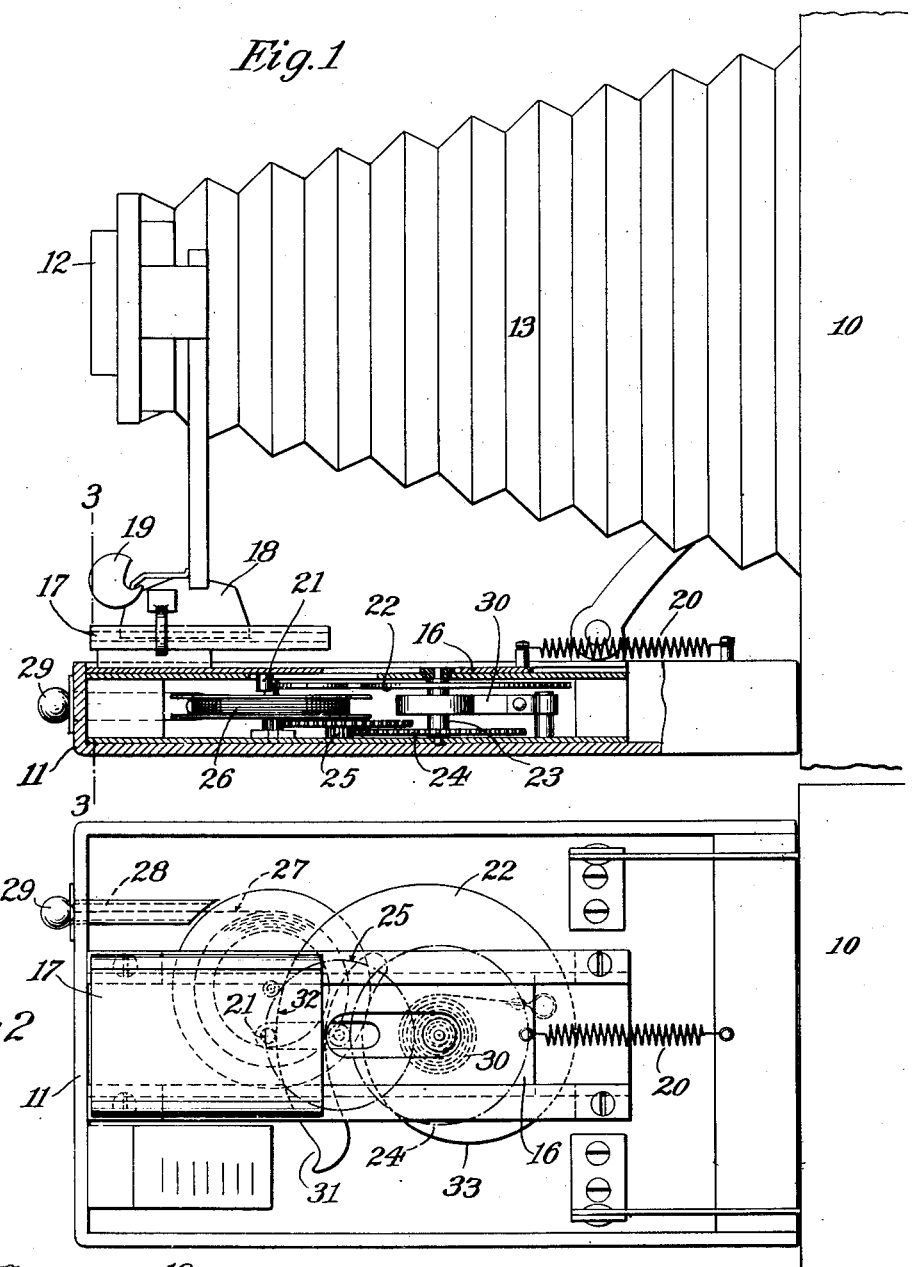
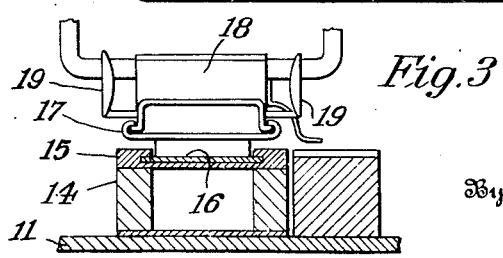
Inventor
Philip E. Young
By his Attorneys
Messimer and Austin

UNITED STATES PATENT OFFICE.

PHILIP E. YOUNG, OF FAIRHAVEN, MASSACHUSETTS.

FOCUSING DEVICE.

1,252,762.   Specification of Letters Patent.   Patented Jan. 8, 1918.

Application filed July 23, 1915. Serial No. 41,434.

*To all whom it may concern:*

Be it known that I, PHILIP E. YOUNG, a citizen of the United States, and resident of Fairhaven, in the county of Bristol and State of Massachusetts, have invented certain new and useful Improvements in Focusing Devices, of which the following is a specification.

My invention relates to a focusing attachment for cameras and the primary object of the invention is to provide a control for automatically focusing the lens relative to the object to be photographed.

I attain this object broadly by providing a mechanism for shifting the lens automatically toward and from the camera back into its proper focusing position by means of a member, such as a flexible cord, designed to reach to the object to be photographed.

More specifically, this object is attained, in one physical embodiment of the invention, by means of a cam designed so that as the cam is rotated over an angle having a definite relation to the distance traveled by the reach member between the minimum distanced point upon which the camera may be focused and the object to be photographed, the cam will shift the lens a distance equal to the distance between the minimum limiting focusing position of the lens and the position thereof when accurately focused upon the object to be photographed. In this embodiment of the invention, the definite relation between the angular movement of the cam and the distance between camera and object is attained by connecting the reach member to the cam through a reducing gear train designed and proportioned so that the relatively long run of the member to the object will cause the cam to turn over a relatively small angle and thus attain a correspondingly accurate setting of the lens independent of any personal equation of the operator.

Another object of the invention is to provide a mechanism for maintaining the camera continuously and automatically in focus with a moving object and still another desideratum is to provide for a manual focusing of the lens on a device of the above identified character.

Various other objects and advantages of the invention will be in part obvious from an inspection of the accompanying drawings and in part will be more fully set forth in the following particular description of one form of mechanism embodying the invention, and the invention also consists in certain new and novel features of construction and combination of parts hereinafter set forth and claimed.

In the accompanying drawings:

Figure 1 is a side elevation of a camera equipped with a preferred embodiment of my invention and with parts broken away to show details of construction;

Fig. 2 is a plan view of the device shown in Fig. 1 with the camera front collapsed to show parts of the bed; and Fig. 3 is a transverse sectional view taken on the line 3—3 of Fig. 1.

In the following description and in the claims, parts will be identified by specific names for convenience of expression but they are intended to be as generic in their application to similar parts as the art will permit.

The invention will be described with reference to a conventional form of camera which includes an inclosing casing 10, a drop front 11 and a lens carriage or camera front 12 which is attached to the front end of the bellows 13 and is slidably mounted upon a bed 14 carried by the front. The bed includes a guide-way 15 extending parallel to the optic axis of the camera in which guide-way is mounted a slide plate 16. The slide plate has an upwardly facing channel plate 17 fixed thereto and extending in the direction of movement of the slide plate. The front 12 includes a base piece 18 slidably mounted in the channel plate and locked in adjusted position by means of a clamp 19. A spring 20 acts on plate 16 to move the same rearwardly toward the position of the lens when in its position focused on remote objects. A cam pin 21 depends from the slide plate and is designed to be drawn by the spring 20 into engagement with the periphery of a toe cam 22 mounted in the path of movement of the pin. The cam is mounted for rotary movement upon a shaft 23 fixed to which shaft is a gear wheel 24 constituting the driven element of a reducing gear train carried by the drop front. The gear wheel 24 is connected through intermediate gearing 25 of the train with a drum 26 positioned adjacent the forward edge of the front 11. A flexible reach member 27 is wrapped on the drum under tension, extends through an opening 28 in the forward edge of the front 11 and terminates in a button 29 by means of which the member 27 may be drawn from the drum. A spring 30 acts on the gear train to return the same and carriage to their initial positions and to wind the flexible member on the drum when the draft pull on said member is released.

The pin engaging periphery of the cam has a starting point 31 adjacent the end of the toe and curves away from this point over an arc 32 concentric with the axis of rotation of the cam so that the initial movement of the cam will not cause any shifting of the lens from its initial position focused for its minimized distanced object. The periphery continues from the arc 32 into an inwardly curved cam surface 33 plotted with reference to the focal functions of the particular lens system used. The cam surface 33 is designed to act through the pin to set the lens in position focused on an object as the cam is rotated over an angle dependent upon the distance of the object from the lens.

In order to illustrate one means for designing this cam let it be assumed that the camera in the drawing may be focused on objects distanced between six and thirty feet therefrom. There should be no movement of the lens carriage as the reach member is drawn out the first six feet and for this reason the circular portion 32 of the cam periphery should be so proportioned that the first six foot run of the member will have no effect on the carriage. The cam portion 33 of the periphery may be plotted by dividing the total degrees of rotation of the cam by the range. In the case assumed the range is (30–6) 24 feet. Radial lines passed through the equal division marks will each indicate the angles for one foot advancement of the reach member. On each succeeding radial line there is plotted toward the center the distance the lens should be moved, to give a perfect focus on the screen. Connecting these plotted points with the smooth curve will give the proper design to the cam.

In operation, and assuming that the drop front is in open position with the lens carriage adjusted in locked position on the channel plate and the camera pointing in the direction facing the object to be photographed, the button is grasped and drawn out to the object. With the reach member held in this position the camera is actuated to take the picture of the object.

Drawing on the button will have the effect of unwrapping the reach member from the drum, thus rotating the drum, actuating the gear train and incidentally placing the spring 30 under tension. Motion is communicated through the gear train to the cam upon which bears the cam pin acting under tension of the spring 20. This spring tends to draw the lens carriage rearwardly toward the casing and sensitive surface and the farther the reach member is drawn out the closer will the lens carriage approach the sensitive surface. This approach of the lens is proportioned to maintain the lens in proper focus on the button in all positions of the same within the range of the camera.

Due to the circular construction of the initial portion of the cam throw, the first portion of the member 30 unwound from the drum (6 feet in the case assumed) will have no effect on the lens carriage. A further pull on the reach member beyond this 6 feet will cause the plotted portion of the cam surface to travel past the cam pin thereby to shift the lens carriage in the manner described.

The reach member may be held in its drawn out position by the operator at the camera or the button may be held by the object photographed.

Releasing the draft pull on the reach member will permit the spring 30 to rewind the member on the drum and re-rotate the cam into its initial position. This will cause the pin engaging surface to retreat in a direction away from the pin thus permitting the spring 20 to act on the lens carriage and to return the same into its initial projected position.

The base piece 18 may be withdrawn from the channel plate and the front 12 collapsed into the casing as shown in Fig. 2. The drop front 11 may then be closed onto the casing as is usual with folding cameras.

By means of a device of this character any of the conventional types of cameras may be equipped so that an object positioned anywhere within the range of the camera may be accurately focused thereon by merely drawing a cord out to the object to be photographed.

As the cam control may be designed with mathematical accuracy a camera equipped with such a device may be focused independently of the skill of the operator and in fact it is not at all necessary for the operator to view the image on the screen. The lens is at all times focused on the free end of the stretched reach member when positioned within the range of the camera.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a camera, the combination with a shiftable focusing lens having a normal short range focusing position, a flexible member designed to extend from the camera to the object to be photographed, lens focusing mechanism acting on said lens, operatively actuated by said member and controlled by the reach of said member to the object to focus the lens on the object and means acting on the lens to return the same to normal position when tension on said flexible member has been released.

2. In a camera, the combination with a casing, a lens shiftable relative to said casing, over short distances, a flexible member adapted to reach to the object to be photographed and having a run relatively long compared to the possible movement of the lens toward the casing, and lens shifting mechanism controlled by the length of said member extended between the camera and object for setting said lens in focus relative to the object.

3. In a camera, a lens focusing mechanism including a control cam, said cam designed to have one part thereof without a throw and a succeeding part having a throw between two points thereon equal to the distance between two focal positions of the lens, and draft means connected to said cam to actuate the same, said means having an initial movement without effect on the lens and a succeeding movement when said cam is rotated over the angle between said points, equal to a definite proportion of the distance between the two positions which are in focus when the lens is in its said focal positions.

4. In a camera, the combination with an automatic lens focusing mechanism and spring means for actuating the same, of a mechanism control member adapted to be carried by a movable object to be photographed, said member operatively connected to said mechanism to cause the spring means to maintain the object continuously in focus.

5. In a camera, the combination of a shiftable lens carriage, a drum, a flexible member wrapped on said drum and designed to be drawn therefrom to reach to the object to be photographed; means acting on said carriage to move the same in one direction, an adjustable stop for said carriage and a reducing gear train between said stop and drum.

6. In a camera, the combination with a shiftable lens carriage, means, including springs for moving the same toward its normal minimum range focusing position, acting on said carriage for focusing the lens, a pull member operatively connected to said means to place the springs under tension and designed to move the lens into progressing focusing positions from its minimum range focusing position as the free end of the pull member is drawn progressively away from the camera.

7. In a camera, the combination with a shiftable lens carriage, means including a cam acting on said carriage for focusing the lens, a pull member and a drum therefore operatively connected to said cam and designed to move the lens into progressing focusing positions from its minimum range focusing position as the free end of the pull member is drawn progressively away from the camera, said means designed so that any unit distance traveled by the end of said pull member bears a predetermined relation to the advance of said lens and means for moving the cam toward its position with the lens carriage at its minimum range position.

8. In a camera, a focusing mechanism including a lens shifting device, a cam acting on said device for controlling the position of the lens, a gear train operatively connected to the cam to rotate the same and a flexible pull member operatively connected to the first member of the gear train to actuate the same whereby a pull on said member will move the lens a distance dependent upon the extent of pull on said member.

9. In a camera, a focusing mechanism including a lens shifting device, a cam acting on said device for controlling the position of the lens, a gear train operatively connected to the cam to rotate the same, a flexible pull member operatively connected to the first member of the gear train to actuate the same whereby a pull on said member will move the lens a distance dependent upon the extent of pull on said member and a spring acting on said train to return the lens into any focusing position permitted by the tension on said pull member.

10. In a camera, a focusing mechanism including means for moving the mechanism from a far distance focusing position toward its minimum distance focusing position and a flexible member operatively connected to said means, and adapted to extend from the camera to the article to be photographed to control the movement of the mechanism under the action of said means, whereby the movement of the mechanism will be limited by the distance of the camera from the object to be photographed.

Signed at New York city, in the county of New York and State of New York this 22nd day of July, A. D., 1915.

PHILIP E. YOUNG.